United States Patent [19]
Entenmann et al.

[11] Patent Number: 6,062,199
[45] Date of Patent: May 16, 2000

[54] METHOD FOR CONTROLLING KNOCKING IN MULTICYLINDER INTERNAL COMBUSTION ENGINES

[75] Inventors: Robert Entenmann, Benningen; Stefan Unland, Vaihingen-Kleinglattbach; Werner Haeming, Neudenau; Iwan Surjadi, Vaihingen; Steffen Franke, Schwieberdingen, all of Germany

[73] Assignee: Robert Bosch GmbH, Stuttgart, Germany

[21] Appl. No.: 09/180,343
[22] PCT Filed: Mar. 3, 1998
[86] PCT No.: PCT/DE98/00603

§ 371 Date: Feb. 25, 1999
§ 102(e) Date: Feb. 25, 1999

[87] PCT Pub. No.: WO98/40625
PCT Pub. Date: Sep. 17, 1998

[30] Foreign Application Priority Data

Mar. 7, 1997 [DE] Germany .......................... 197 09 395

[51] Int. Cl.[7] ....................................... F02P 5/152
[52] U.S. Cl. ................. 123/406.21; 123/406.37
[58] Field of Search .............. 123/406.21, 406.16, 123/406.2, 406.33, 406.37

[56] References Cited

U.S. PATENT DOCUMENTS

| | | | |
|---|---|---|---|
| 4,211,194 | 7/1980 | Kenji et al. | 123/406.37 |
| 4,612,902 | 9/1986 | Abe et al. | 123/406.21 |
| 4,625,692 | 12/1986 | Kashimura et al. | 123/406.21 |
| 4,726,339 | 2/1988 | Nagai | 123/406.33 |
| 5,027,775 | 7/1991 | Iwata | 123/406.21 |

FOREIGN PATENT DOCUMENTS

| | | |
|---|---|---|
| 2 475 136 | 8/1981 | France. |
| 2 510 669 | 2/1983 | France. |

*Primary Examiner*—Henry C. Yuen
*Assistant Examiner*—Hieu T. Vo
*Attorney, Agent, or Firm*—Kenyon & Kenyon

[57] ABSTRACT

Method of knock control in multicylinder internal combustion engines, with one knock sensor being provided for a group of cylinders, and with a control unit determining and outputting the control quantities for the ignition of the individual cylinders on a selective basis for the cylinders. At least one cylinder, preferably the cylinder(s) sensed best by the knock sensor, is/are selected as the lead cylinder. A knocking event in a lead cylinder causes a retard in the firing for all cylinders of the group, while a knocking event in one of the other cylinders causes a retard in only this one cylinder.

19 Claims, 3 Drawing Sheets

METHOD FOR CONTROLLING KNOCKING IN MULTICYLINDER INTERNAL COMBUSTION ENGINES

BACKGROUND INFORMATION

It is described in, e.g., the handbook.

It is known from the related art, e.g., the handbook Autoelektrik/Autoelektronik am Ottomotor/Bosch [Automotive Electrical and Electronic Systems on the Spark Ignition Engine/Bosch](1st edition, VDI Verlag 1987, ISBN 3-18-419 106-0), that the operation of an internal combustion engine should approach the knock limit as closely as possible for optimum torque. Knocking is an uncontrolled form of combustion which can damage an engine. For this reason, the firing angle is normally set so that there is always a safety margin from the knock limit. However, since the knock limit depends on fuel quality, engine condition and environmental conditions, gasoline consumption may be impaired due to the safety margin of late firing angles. Therefore, there have been many attempts to determine the knock limit during operation and set the firing angle as close to this known limit as possible. To guarantee operation as close to the knock limit as possible, knock sensors are provided to detect knocking and relay an appropriate signal to the control unit. One knock sensor is usually provided for multiple cylinders to detect knocking noises in these cylinders. In internal combustion engines with a large number of cylinders or with an unfavorable arrangement of cylinders, a knock sensor cannot sense all cylinders equally well due to the knock sensor installation site. In such cases, two knock sensors may be used per engine to permit analysis of sounds in all cylinders as much as possible.

SUMMARY OF THE INVENTION

The method of knock control according to the present invention with the characterizing features of the main claim has the advantage in comparison with the known method that knock control can also be performed for all cylinders in multicylinder internal combustion engines even if only one knock sensor is provided for a group of cylinders and not all cylinders are sensed equally well by the knock sensor. In normal operation of an internal combustion engine, knock control is performed for each cylinder individually on the basis of knocking in the individual cylinders. In certain operating ranges, e.g., at a very high rpm, operation is switched to knock control with a lead cylinder. Using only one knock sensor for a group of multiple cylinders also has the advantage that only the signal of one knock sensor need be analyzed, thereby reducing analysis expense and thus freeing up computer capacity. The advantage of selecting at least one cylinder from the group of cylinders as one or more lead cylinders, with the selected cylinder(s) preferably being the cylinder(s) of the cylinder group sensed best by the knock sensor or the cylinder(s) with the highest incidence of knocking, is that knocking in this cylinder or in these cylinders permits knock control for all cylinders. The other cylinders of the cylinder group are guided along the knock limit as guided cylinders on the basis of knocking in the lead cylinder(s). This permits even better knock-free operation of the internal combustion engine at the knock limit. Another advantage is that knocking detected in one of the guided cylinders causes a knock adjustment only in this cylinder. This prevents a firing adjustment, which causes a loss of torque, from being triggered in all cylinders.

It is also advantageous. It is especially advantageous to perform the ignition retard of the guided cylinder in a plurality of steps, so that sudden changes in torque are prevented. It is further advantageous to provide a safety offset in the firing angle ignition retard value for the guided cylinders in comparison with the lead cylinder, because then the knocking tendency in these guided cylinders is reduced in comparison with the lead cylinders operated directly at the knock limit.

DETAILED DESCRIPTION

Figure 1:
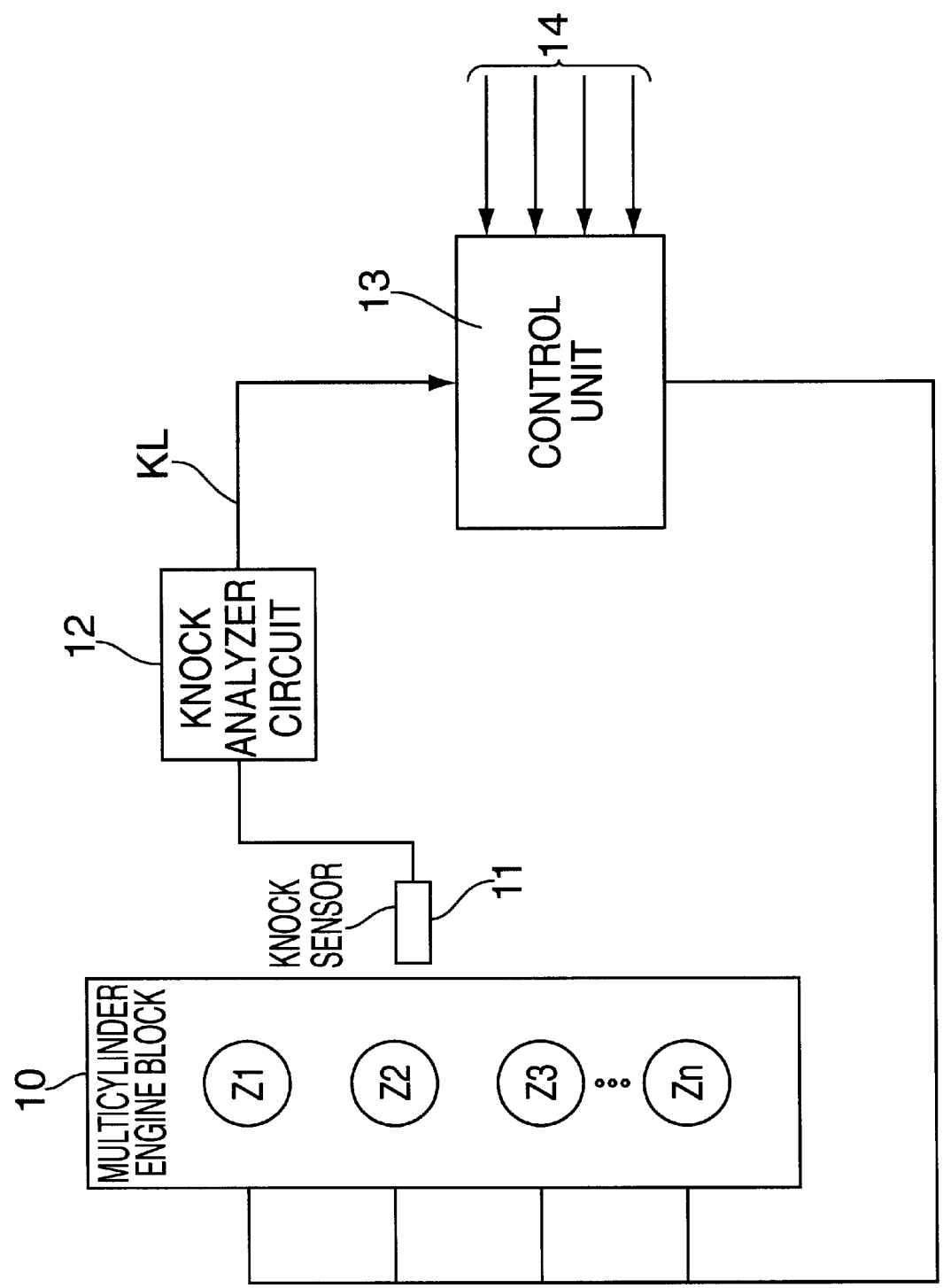
FIG. 1 shows an exemplary diagram of an ignition system for performing a knock control.

FIG. 1 shows a schematic diagram of a multicylinder engine block 10, with a knock sensor 11 being assigned to multicylinder engine block 10. For example, a structure-borne noise sensor or a cylinder pressure sensor may be used as the knock sensor. The signal of knock sensor 11 is sent to a knock analyzer circuit 12 which is in turn connected to a control unit 13. Control unit 13 calculates a prevailing ignition map-based firing angle KZW or firing time KZZP on the basis of input quantities 14 detected by sensors, such as the rpm, the load, the supply voltage or the intake manifold pressure. Knock sensor analyzer circuit 12 delivers a suitable signal KL to control unit 13 when knocking occurs. After knocking occurs, ignition map-based firing angle KZW or ignition map-based firing time KZZP is adjusted in the direction of "retard" and the following description relates only to the displacement of the firing angle. However, the firing time would be adjusted only in the time plane in similar steps. This procedure is repeated with each combustion recognized as knocking for a cylinder. If no more knocking occurs, the firing angle which has previously been retarded is gradually returned in small increments in the direction of advance until reaching its ignition map value. The firing angle is returned here only after a predetermined number n of knock-free combustions (KL-free).

Figure 2:
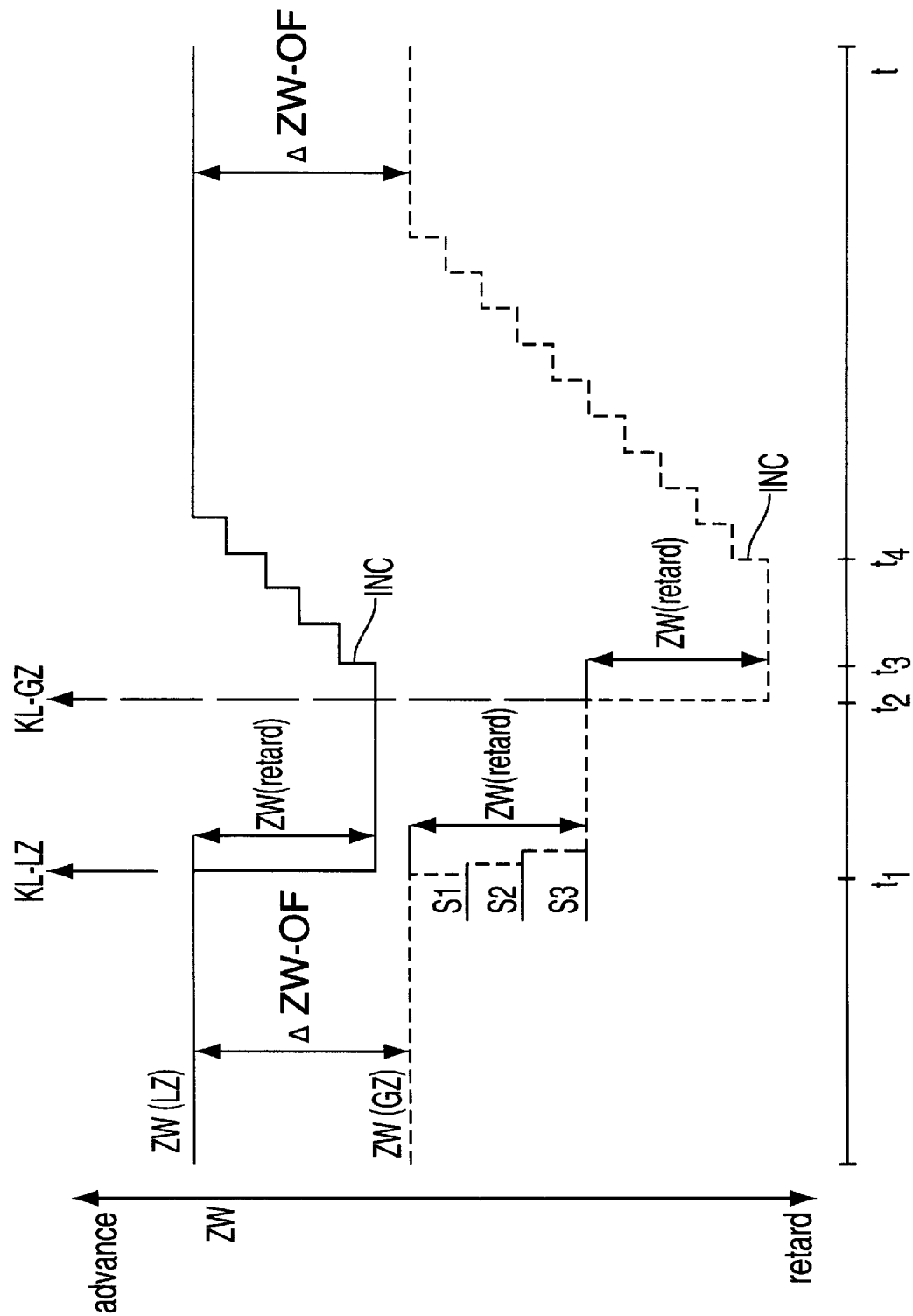
FIG. 2 shows firing angle curves of a lead cylinder and a guided cylinder over time.

FIG. 2 illustrates the various firing angle curves of lead cylinder LZ and other guided cylinders GZ in knocking operation and in knock-free operation for the case when only one cylinder is serving as the lead cylinder. FIG. 2 shows the firing angle of a lead cylinder with signal curve ZW(LZ). A lead cylinder LZ is a cylinder selected from a group of cylinders, e.g., the cylinders of an engine block or a cylinder block. With selected lead cylinder LZ the combustion conditions are prevaried in a controlled manner for the method according to the present invention so that this cylinder knocks first. Thus, lead cylinder LZ is the cylinder with the greatest tendency to knock. The dotted line indicates firing angle ZW-(GZ) of a guided cylinder. A guided cylinder GZ is not sensed as well due, for example, to the installation site of the knock sensor, so that knocking in a guided cylinder may not be recognized as knocking under some circumstances. To guarantee knock control even in guided cylinders GZ, knock control for all cylinders is handled on the basis of the knock results in lead cylinder LZ in such a manner that when knocking occurs in lead cylinder KL-LZ, the firing angle is retarded in all cylinders in that cylinder group, i.e., also in guided cylinder GZ. In FIG. 2, knocking occurs in lead cylinder KL-LZ at time t1. With a knocking event KL, the firing angle of lead cylinder is retarded by ZW(LZ). At the same time, the firing angle of other cylinders ZW retard is retarded. It is advantageous to retard the guided cylinders in a plurality of steps s1 through s3, as shown in FIG. 2 with the retard of the firing angles of the guided cylinders ZW(GZ) beginning at time $t_1$. Therefore, there are no drastic changes in torque, thus resulting in smooth engine running and thus greater driving comfort. The retard of guided cylinders GZ which takes place in a plurality of steps s1, s2, s3 after knocking of a lead cylinder KL-LZ is continued until safety offset ΔZW-OF of the firing angle of guided cylinders GZ relative to the firing angle of lead cylinder ZW(LZ) is restored. This safety offset ΔZW-OF can be determined as a function of parameters of the internal combustion engine such as engine temperature, load, rpm and the prevailing ignition retard of the lead cylinder. After a predetermined number of knock-free combustions (nKL-free), there is an incremental restoration of the firing angles adjusted toward "advantage" for all cylinders. The firing angle is restored incrementally for all cylinders, with the firing angle of the lead cylinder approaching the ignition map-based firing angle and the other cylinders maintaining a safety margin ZW-OF from the firing angle of the lead cylinder. In FIG. 2, the restoration of the firing angle of the lead cylinder begins at time $t_3$. Knocking KL-GZ has occurred in a guided cylinder GZ at time $t_2$. Then there is a retard of the firing angle of guided cylinder ZW(GZ) in the direction of "retard" in a single step. This retard of the firing angle of one guided cylinder ZW-(GZ), in which knocking occurred at time $t_2$, is also performed only in the guided cylinder in which the knocking event occurred. Then after a predetermined number n of knock-free combustions KL-free, the firing angle is also returned in the direction of "advance" to the ignition map-based firing angle at time $t_4$ for this guided cylinder. This description of firing angle adjustment for individual cylinders is applicable accordingly if lead or guide firing angle FZW is determined from the firing angles of several lead cylinders of a group of cylinders. Safety offset ΔZW-OF of guided cylinder GZ is then based on the distance from guide or lead firing angle FZW.

As indicated above, the combustion conditions are pre-varied in a controlled manner for a minimum of one selected lead cylinder LZ so that knocking occurs first in the minimum of one lead cylinder in operation at risk of knocking. This controlled preliminary variation in combustion conditions means, for example, that either the lead cylinder's firing angle to be output is varied in the direction of the knock limit or, as shown in FIG. 2, the firing angles are varied away from the knock limit by the safety offset in comparison with guide or lead firing angle FZW of the minimum of one lead cylinder. With a change in control quantities for other guided cylinders GZ, first the control unit determines the firing angle for the lead cylinder as close to the knock limit as possible, and then a safety offset ΔZW-OF is added to this firing angle. This safety offset ΔZW-OF thus represents the safety margin from the knock limit. Also in the restoration of the ignition retard of the firing angle in the direction of the ignition map-based firing angle after a predetermined number n of knock-free combustions, this safety offset ΔZW-OF of the firing angle of the guided cylinders relative to guide or lead firing angle FZW of the minimum of one lead cylinder is maintained. Restoring the firing angle for a guided cylinder in the direction of ignition map-based firing angle KZW is ended when the firing angle of this guided cylinder differs from guide or lead firing angle FZW of the minimum of one lead cylinder by the amount of safety offset ΔZW-OF.

Figure 3:
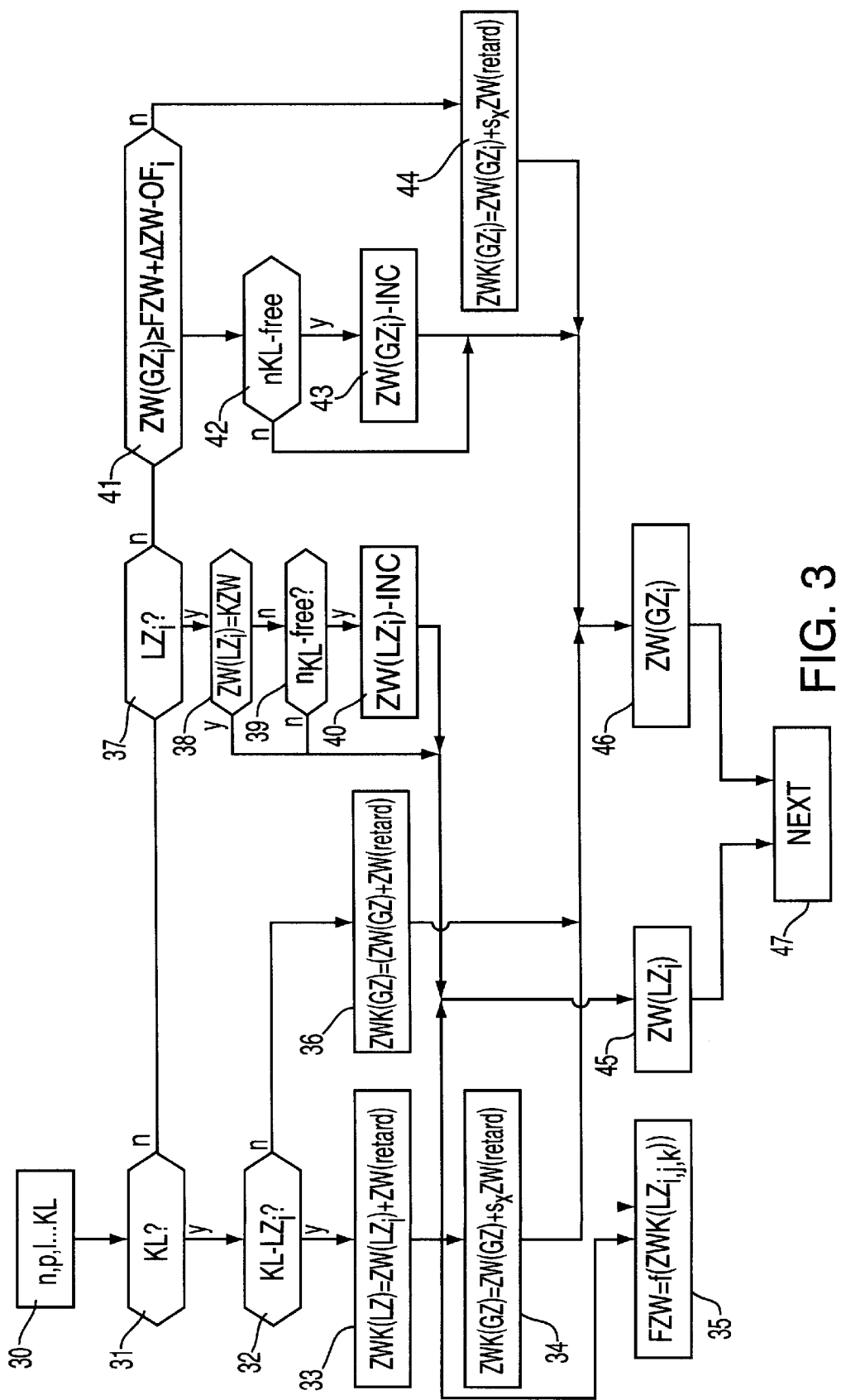
FIG. 3 shows individual procedural steps in a program sequence of a method according to the present invention.

FIG. 3 shows the individual procedural steps for carrying out the method according to the present invention in a program sequence. In a first procedural step 30, the prevailing (operating) parameters of the internal combustion engine such as rpm n, load L, pressure p and also (knock) signal KL are obtained. Then in procedural step 31, a check is performed to determine whether a knocking event KL has been detected. If a knocking event KL has occurred, the YES output of procedural step 31 leads to a procedural step 32 where a check is performed to determine whether the knocking event detected has occurred in a lead cylinder (KL-$LZ_i$). If this is the case, the additively corrected firing angle of the corresponding lead cylinder ZWK($LZ_i$) is formed from the sum of the prevailing firing angle of the lead cylinder plus the retard (ZW($LZ_i$)+ZW(retard)), where the prevailing firing angle may be the ignition map-based firing angle or the firing angle already corrected by addition previously. Like the firing angle of the lead cylinder, the firing angle of guided cylinders GZ is shifted in the direction of retard in procedural step 34 after a knocking event KL in the lead cylinder. However, the retard of the firing angle of guided cylinder GZ does not take place in one step as with the lead cylinder, but in a plurality of steps s1, s2 and s3 as shown in FIG. 2, which is illustrated in this procedural step with addition $S_x$ at the retard value of firing angle ZW(retard). One output of procedural step 33 is also sent to procedural step 35. In procedural step 35, a guide firing angle FZW is determined from the corrected firing angles of lead cylinders i, j, k, where guide firing angle FZW=f(ZWK ($LZ_{i,j,k}$)) is a function of the firing angles of the lead cylinders.

If knocking event KL, detected in procedural step 31, was not assigned to a lead cylinder in process step 32, then the NO output of procedural step 32 leads to procedural step 36, where the corrected firing angle of the guided cylinder ZWK(GZ) where knocking has occurred is determined; here again, a firing angle retard in added to the firing angle of the guided cylinder ZW(GZ)−(ZW(GZ)+ZW(retard)).

For the case when no knocking KL has occurred in the most recent firing sequence in procedural step 31, a check is performed in procedural step 37 to determine whether this knock-free firing sequence can be assigned to a lead cylinder. If this is the case, then in a subsequent procedural step 38 a query determines whether the prevailing firing angle of the lead cylinder ZW(LZ) corresponds to ignition map-based firing angle KZW. If this is not the case, then in a subsequent procedural step 39 a check is performed to determine whether a predetermined number n of knock-free combustions has occurred. If this is the case, then in procedural step 40 the firing angle of the lead cylinder ZW(LZ) is corrected in the direction of "advance" for a restoration of the retard to ignition map-based firing angle KZW by an increment INC. If no predetermined number of knock-free combustions has occurred, the firing angle is retained.

If the combustion which is recognized as knock-free in procedural step 31 did not take place in the lead cylinder, but the analyzed firing sequence has taken place in a guided cylinder ($GZ_i$), then procedural step 41 analyzes whether the firing angle of the guided cylinder ZW($GZ_i$) is greater than or equal to the calculated guide firing angle with safety offset ΔZW-OF, so that ZW($GZ_i$)≧FZW+ΔZW-OF. This procedural step 41 then determines whether the firing angle of the guided cylinder differs from the lead firing angle which is formed from the firing angles of the lead cylinder or cylinders only by the value of the safety offset. If the distance from the firing angle of the guided cylinder relative to the guide firing angle is greater than this safety offset, then the YES output of procedural step 41 leads to procedural step 42, where a check is performed to determine whether a predetermined number of knock-free combustions has already taken place in this guided cylinder, so that the retard of the firing angle performed earlier can be reversed, and the firing angle can be changed incrementally in the direction of "advance" by one increment INC.

If it was found in procedural step 41 that the firing angle of the guided cylinder relative to the guide firing angle does not have the safety offset, then the NO output leads to procedural step 44. In this procedural step 44, a corrected firing angle is calculated for the guided cylinder ZWK(GZ$_i$) which has just been analyzed by adjusting the previous firing angle of the guided cylinder ZW(GZ$_i$) in the direction of "retard" by one increment s$_x$ (ZWK(GZ$_i$)=ZW(GZ$_i$)+s$_x$ZW (retard)). If it was found in procedural step 42 that a predetermined number n of knock-free combustions has not yet occurred in this cylinder, then there is no adjustment back in the direction of "advance" and the previous firing angle is retained.

Depending on whether and in which cylinder a knocking event has occurred, a corresponding path of the program sequence is run through to determine the firing angle. In any case, however, a firing angle of the analyzed cylinder is fixed at the end of this procedure for the subsequent firing operation in this cylinder.

For this purpose, the outputs of procedural steps 33, 38, 39 and 40 are sent to a procedural step 45, where the firing angle determined is stored for the lead ZW(LZ).

Likewise, the outputs of procedural steps 34, 36, 42, 43 and 44 are sent to procedural step 46, where the firing angle for the guided cylinder in question ZW(GZ$_i$) is stored as the firing angle for the subsequent firing operation in this cylinder.

Both procedural steps 45 and 46 are combined in one procedural step 47, and the method begins again for the next firing operation.

What is claimed is:

1. A method for a knock control in a multicylinder internal combustion engine, comprising the steps of:
    assigning a single knock sensor to a group of cylinders of the multicylinder internal combustion engine;
    with the single knock sensor, detecting knock signals of all combustions in the group of cylinders;
    transmitting the knock signals to an analyzer unit;
    selecting at least one particular cylinder of the group of cylinders;
    with a control unit, determining and outputting control quantities of an ignition for the at least one particular cylinder, the control quantities including a first firing angle value; and
    with the control unit, driving the at least one particular cylinder as a function of the first firing angle value, wherein the first firing angle value is numerically closer, than at least one second firing angle value, to a predetermined knock limit value, the at least one second firing angle value corresponding to at least one further cylinder of the group of cylinders.

2. The method according to claim 1, wherein the at least one particular cylinder includes a lead cylinder, and further comprising the steps of:
    determining a lead firing angle value of the lead cylinder as a function of the first firing angle value; and
    determining the at least one second firing angle value as a function of the lead firing angle value.

3. The method according to claim 2, further comprising the steps of:
    detecting a knocking event in the lead cylinder; and
    retarding the first firing angle value and the at least one second firing angle value when the knocking event is detected.

4. The method according to claim 3, further comprising the steps of:
    detecting a further knocking event in one of the at least one further cylinder; and
    retarding the at least one second firing value only in the one of the at least one further cylinder when the further knocking event is detected.

5. The method according to claim 4, further comprising the step of:
    modifying the first firing angle value as a function of a safety offset value to change the first firing angle value to be numerically further away from the predetermined knock limit value for determining the at least one second firing angle value.

6. The method according to claim 1, further comprising the steps of:
    detecting a knocking event in a lead cylinder of the group of cylinders; and
    retarding the at least one second firing angle value in a plurality of smaller substeps after the knocking event is detected.

7. The method according to claim 1, wherein the at least one particular cylinder includes a lead cylinder, and further comprising the steps of:
    detecting a knocking event in the lead cylinder; and
    retarding the first firing angle of the lead cylinder in a single step after the knocking event is detected.

8. The method according to claim 1, wherein the at least one particular cylinder includes a plurality of lead cylinders, and further comprising the step of:
    selecting the lead cylinders from the group of cylinders.

9. The method according to claim 8, wherein the single knock sensor has a higher sensitivity with respect to the lead cylinders than to other cylinders.

10. A method for a knock control in a multicylinder internal combustion engine, comprising the steps of:
    assigning a single knock sensor to a group of cylinders of the multicylinder internal combustion engine;
    with the single knock sensor, detecting knock signals of all combustions in the group of cylinders;
    transmitting the knock signals to an analyzer unit;
    selecting at least one particular cylinder of the group of cylinders, while leaving at least one cylinder unselected;
    with a control unit, determining and outputting first control quantities of an ignition for the at least one particular cylinder, the first control quantities including a first firing angle value;
    with the control unit, determining and outputting second control quantities of an ignition for the at least one unselected cylinder, the second control quantities including at least one secondary firing angle value, each of the at least one secondary firing angle value uniquely corresponding to one of the at least one unselected cylinder, wherein each of the at least one secondary firing angle value is, in comparison with the first firing angle value, numerically further away from a predetermined knock limit value by a predetermined offset value; and
    with the control unit, driving each of the at least one unselected cylinder as a function of a corresponding one of the at least one secondary firing angle value.

11. The method according to claim 10, wherein the at least one particular cylinder includes a lead cylinder, and further comprising the steps of:

determining a lead firing angle value of the lead cylinder as a function of the first firing angle value; and determining the at least one secondary firing angle value as a function of the lead firing angle value.

12. The method according to claim 10, further comprising the steps of:

detecting a knocking event in the lead cylinder; and retarding the first firing angle value and the at least one secondary firing angle value when the knocking event is detected.

13. The method according to claim 10, further comprising the steps of:

detecting a further knocking event in one of at least one further cylinder; and retarding the at least one secondary firing value only in the one of the at least one further cylinder when the further knocking event is detected.

14. The method according to claim 10, further comprising the steps of:

detecting a knocking event in a lead cylinder of the group of cylinders; and retarding the at least one secondary firing angle value in a plurality of smaller substeps after the knocking event is detected.

15. A method for a knock control in a multicylinder internal combustion engine operating at a high r.p.m. value, comprising the steps of:

assigning a single knock sensor to a group of cylinders of the multicylinder internal combustion engine;

with the single knock sensor, detecting knock signals of all combustions in the group of cylinders;

transmitting the knock signals to an analyzer unit;

selecting at least one particular cylinder of the group of cylinders;

with a control unit, determining and outputting control quantities of an ignition for the at least one particular cylinder, the control quantities including a first firing angle value; and with the control unit, driving the at least one particular cylinder as a function of the first firing angle value, wherein the first firing angle value is numerically closer, than at least one second firing angle value, to a predetermined knock limit value, the at least one second firing angle value corresponding to at least one further cylinder of the group of cylinders.

16. The method according to claim 15, wherein the at least one particular cylinder includes a lead cylinder, and further comprising the steps of:

determining a lead firing angle value of the lead cylinder as a function of the first firing angle value; and determining the at least one second firing angle value as a function of the lead firing angle value.

17. The method according to claim 15, further comprising the steps of:

detecting a knocking event in the lead cylinder; and retarding the first firing angle value and the at least one second firing angle value when the knocking event is detected.

18. The method according to claim 15, further comprising the steps of:

detecting a further knocking event in one of the at least one further cylinder; and retarding the at least one second firing value only in the one of the at least one further cylinder when the further knocking event is detected.

19. The method according to claim 15, further comprising the steps of:

detecting a knocking event in a lead cylinder of the group of cylinders; and retarding the at least one second firing angle value in a plurality of smaller substeps after the knocking event is detected.

* * * * *

UNITED STATES PATENT AND TRADEMARK OFFICE
CERTIFICATE OF CORRECTION

PATENT NO. : 6,062,199
DATED : May 16, 2000
INVENTOR(S) : Robert Entenmann, et al.

It is certified that error appears in the above-identified patent and that said Letters Patent is hereby corrected as shown below:

Column 1, line 7, delete "It is known from the related art, e.g., the handbook".

Column 1, line 37, delete "with the characterizing features of the main claim".

Signed and Sealed this

Twenty-second Day of May, 2001

*Attest:*

NICHOLAS P. GODICI

*Attesting Officer*  *Acting Director of the United States Patent and Trademark Office*